(12) United States Patent
Miller et al.

(10) Patent No.: US 8,063,914 B1
(45) Date of Patent: Nov. 22, 2011

(54) RENDERING ANTIALIASED GEOMETRY TO AN IMAGE BUFFER USING JITTERING

(75) Inventors: Gavin S. P. Miller, Los Altos, CA (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 947 days.

(21) Appl. No.: 11/832,765

(22) Filed: Aug. 2, 2007

(51) Int. Cl.
*G09G 5/00* (2006.01)

(52) U.S. Cl. ........ 345/611; 345/581; 345/589; 345/592; 345/612; 345/613; 345/614; 382/269; 382/274; 382/275

(58) Field of Classification Search .................... None
See application file for complete search history.

(56) References Cited

U.S. PATENT DOCUMENTS

| | | |
|---|---|---|
| 5,859,645 A | 1/1999 | Latham |
| 5,872,729 A | 2/1999 | Deolaliker |
| 6,396,502 B1 * | 5/2002 | Cunniff .................. 345/582 |
| 6,906,729 B1 * | 6/2005 | Sanz-Pastor et al. ......... 345/611 |
| 7,050,068 B1 | 5/2006 | Bastos et al. |

OTHER PUBLICATIONS

Don P. Mitchell, "Spectrally Optimal Sampling for Distribution Ray Tracing," ACM SIGGRAPH Computer Graphics, Jul. 1991, pp. 157-164, vol. 25, No. 4, ACM Press, New York, NY.

* cited by examiner

*Primary Examiner* — Antonio Caschera
(74) *Attorney, Agent, or Firm* — Robert C. Kowert; Meyertons, Hood, Kivlin, Kowert & Goetzel, P.C.

(57) ABSTRACT

Anti-aliased output based on a scene comprising a plurality of objects may be generated. In one embodiment, a number of samples for an anti-aliasing operation is determined. For each of the samples: each of the objects may be translated in space according to jitter values; the objects may be multiplied by a fractional alpha value for the respective sample; a fractional alpha value stored in a buffer may be modified by a transparency value for each transparent object; and the objects may be rendered to the buffer by blending the objects with existing contents of the buffer. The fractional alpha values may vary from sample to sample. In one embodiment, the plurality of objects comprises one or more opaque objects and one or more transparent objects. In one embodiment, the objects may be rendered directly to a screen buffer.

39 Claims, 7 Drawing Sheets

RENDERING ANTIALIASED GEOMETRY TO AN IMAGE BUFFER USING JITTERING

BACKGROUND

1. Field of the Invention

The present invention is directed to computer systems; and more particularly, it is directed to the rendering of anti-aliased artwork using computer systems.

2. Description of the Related Art

As the power and complexity of personal computer systems increase, graphics operations are increasingly being performed by dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of digital images. The geometric objects may typically be located in two-dimensional or three-dimensional space. To render vector graphics on raster-based imaging devices (e.g., most display devices and printers), the geometric objects are typically converted to raster graphics data in a process called rasterization.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes a plurality of execution channels that can be used simultaneously. A GPU may also include dedicated structures or built-in program instructions for anti-aliasing rendered objects. Anti-aliasing is any technique for minimizing the jagged, pixilated, or "aliased" edges of objects. Typically, aliasing occurs on objects with non-orthogonal edges, and anti-aliasing may be used to provide a smoother appearance for those edges on a display screen, printed document, or other image rendered on a raster-based imaging device.

One approach for performing anti-aliasing using a GPU includes rendering the artwork to an off-screen buffer (e.g., a multi-sampling image buffer) that is larger than the final displayed image on the target imaging device. The super-sampled image may include a set of samples, each with its own color and alpha values, to represent each pixel at the display resolution. The super-sampled image may then be reduced in size (e.g., using appropriate filtering or averaging of neighboring samples) to generate an anti-aliased image in the screen buffer at the display resolution. Typically, the super-sampled image is larger than the final image by a power of 2. Another approach for performing anti-aliasing using a GPU includes rendering the image several times, slightly "jittering" the camera each time, and averaging the resulting images to generate an anti-aliased image in the screen buffer. The jittering approach typically requires the allocation of multiple off-screen color buffers and depth buffers in the GPU memory (e.g., one color buffer and depth buffer per sample) for storage of the individual jittered images.

Both the super-sampling technique and the jittering technique may consume an extensive amount of the GPU's built-in memory, bandwidth, and other resources. Therefore, the number of samples available in an anti-aliasing operation using these approaches may be limited by the amount of GPU memory. It may be desirable to perform anti-aliasing with more samples per pixel than are available using the super-sampling technique or the jittering technique on a typical GPU.

SUMMARY

Various embodiments of systems, methods, and computer-readable storage media for rendering anti-aliased artwork to a screen buffer are disclosed. Anti-aliased output based on a scene comprising a plurality of objects may be generated. The plurality of objects may comprises one or more opaque objects and one or more transparent objects. According to one embodiment, a number (N) of samples for an anti-aliasing operation may be determined. The "smoothness" of the anti-aliased output may vary with N, where larger values of N tend to produce smoother and less "jagged" output. In contrast to the typical super-sampling and jittering techniques described previously, N may not be a power of 2 or even a multiple of 2. For each of the samples, each of the objects may be translated in space according to jitter values for the respective sample. Each instance of jittering may translate a scene by a small amount (e.g., in the x and y dimensions), usually less than the size of a pixel. According to one embodiment, the objects may also be translated in depth (i.e., in the z dimension).

For each of the samples, the objects for the respective sample may be multiplied by a fractional alpha value for the respective sample. According to one embodiment, the fractional alpha value for each of the plurality of objects may be set to a value inversely proportional to N such as 1/N. According to one embodiment, the fractional alpha values may vary from sample to sample. For example, for the Mth iteration of the jittering, the fractional alpha value may be set to 1/(M+1). The use of a variable fractional alpha value may reduce a loss of precision in the anti-aliased output. Additionally, the fractional alpha value stored in the buffer may be modified by the transparency value of each transparent object. For example, the fractional alpha value may be reduced in value each time a transparent object is rendered.

For each of the samples, the objects for the respective sample may be rendered to a buffer by blending the objects for the respective sample with existing contents of the buffer (i.e., the contributions of previous samples). According to one embodiment, the objects may be rendered directly to a screen buffer having the same resolution as the target display device.

Figure 1:
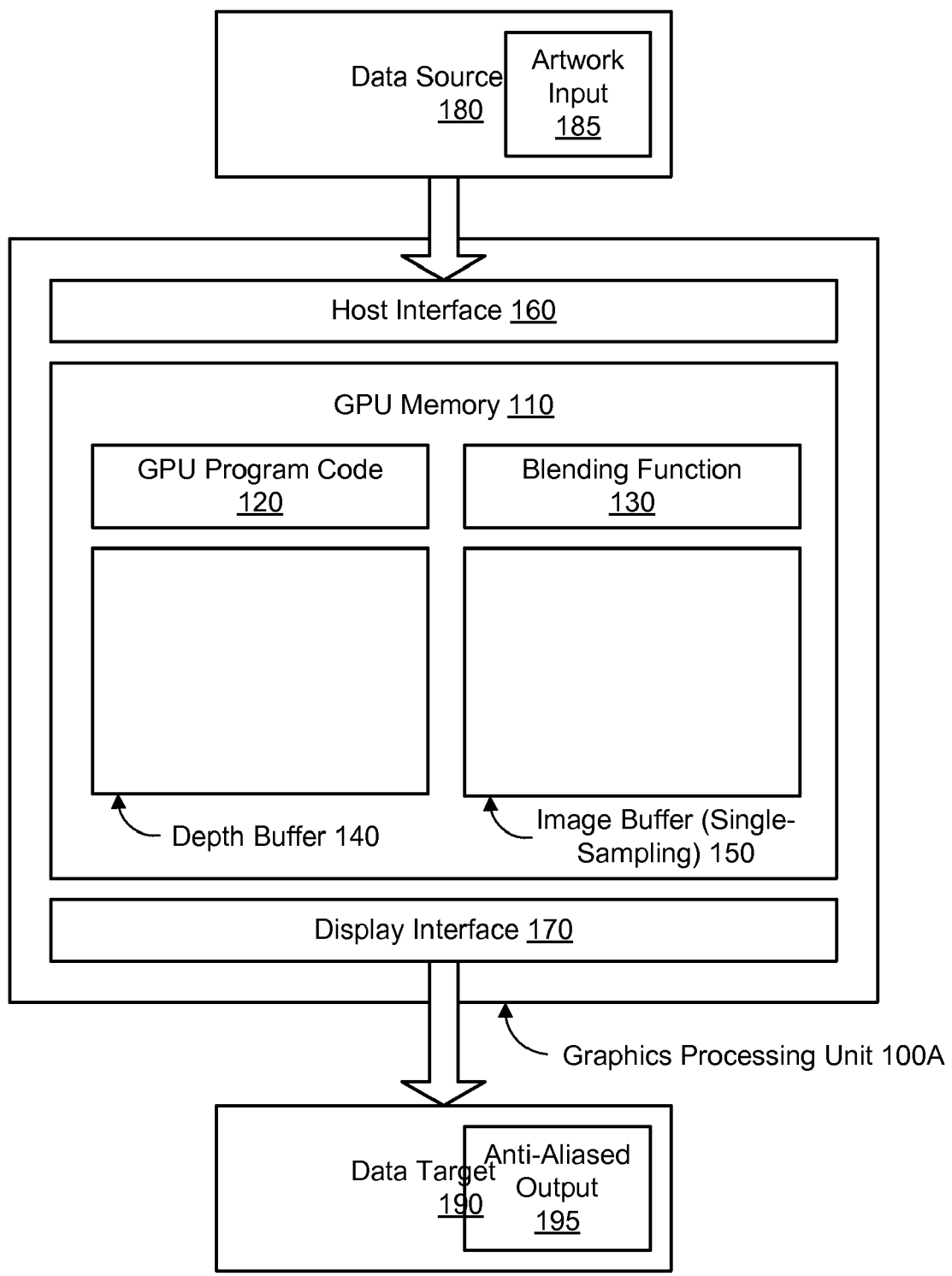
FIG. 1 is a block diagram illustrating one embodiment of a graphics processing unit (GPU) configured for rendering anti-aliased artwork to a screen buffer at display resolution.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 7:
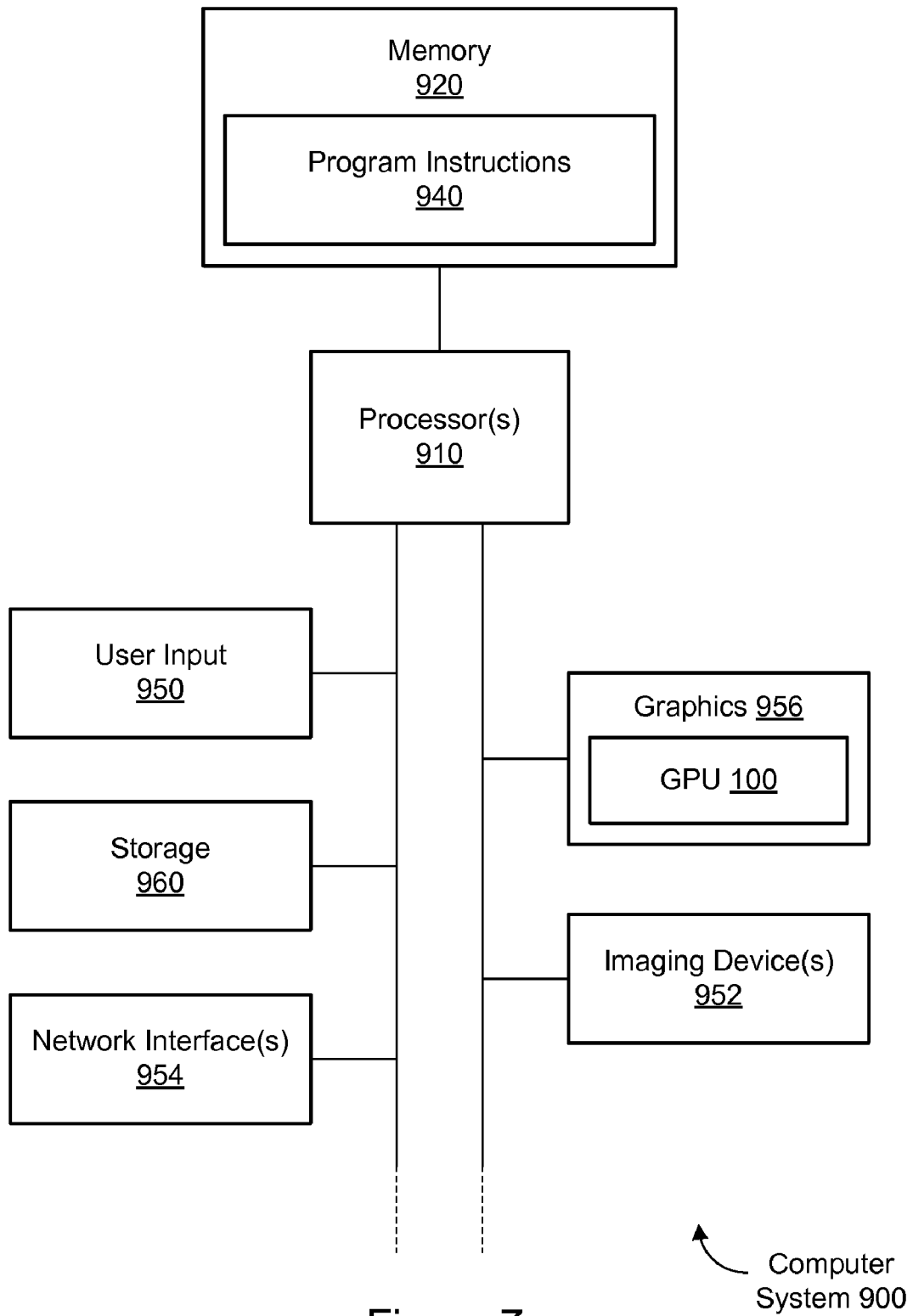
FIG. 7 is a block diagram illustrating constituent elements of a computer system that is configured to implement embodiments of the system and method for rendering anti-aliased artwork.

Using embodiments of the systems and methods described herein, an instance of computer graphics artwork (referred to herein as "a scene") may be rendered to a buffer with anti-aliasing. In one embodiment, a graphics processing unit (GPU) may be used to perform aspects of artwork rendering and anti-aliasing operations. FIG. 1 is a block diagram illustrating one embodiment of a GPU configured for rendering anti-aliased artwork to a buffer at display resolution. A graphics processing unit (GPU) 100A, also referred to herein as a graphics processor, may comprise a dedicated graphics rendering device associated with a computer system. An example of a suitable computer system 900 for use with a GPU is illustrated in FIG. 7. Turning back to FIG. 1, a GPU 100A may include numerous specialized components configured to optimize the speed of rendering graphics output. For example, the GPU 100A may include specialized components for rendering three-dimensional structures, for applying textures to surfaces, etc. For the sake of illustration, however, only a limited selection of components is shown in the example GPU 100A of FIG. 1. It is contemplated that GPU architectures other than the example architecture of FIG. 1 may be suitable for implementing the techniques described herein. The GPU 100A may implement one or more application programmer interfaces (APIs) that permit programmers to invoke the functionality of the GPU. Suitable GPUs may be commercially available from vendors such as NVIDIA Corporation, ATI Technologies, and others.

The GPU 100A may include a host interface 160 configured to communicate with a data source 180 (e.g., a communications bus and/or processor(s) 910 of a host computer system 900, or the host system itself). For example, the data source 180 may provide input data (e.g., a scene comprising one or more geometric objects) and/or executable program code to the GPU 100A. In some embodiments, the host interface 160 may permit the movement of data in both directions between the GPU 100A and the data source 180. The GPU 100A may also include a display interface 170 for providing output data to a data target 190. For example, the data target 190 may comprise a display device 952, and the GPU 100A (along with other graphics components and/or interfaces 956) may "drive" the display 952 by providing graphics data at a particular rate from a screen buffer (e.g., the image buffer 150).

In one embodiment, the GPU 100A may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100A may also be configured to access memory 920 of a host computer system 900 via the host interface 160.

In one embodiment, program instructions 940 may be stored in the memory 920 of the host computer system 900 and executed by the host computer system 900 to generate anti-aliased output 195 based on artwork input 185. The artwork input 185 may include a scene comprising one or more geometric objects (e.g., as vertices and associated data in a tessellation). In one embodiment, a raster-based texture may be mapped to a geometric object in the artwork input 185.

In one embodiment, the geometric objects in the artwork input 185 may be rasterized to pixels during a rendering process. In one embodiment, the transparency properties of a vertex or pixel may be indicated by one or more alpha values. The alpha value(s) may be stored in one or more alpha channels along with one or more color channels (e.g., representing red, green, and blue values) for each vertex or pixel. Objects referred to as "transparent" may have alpha values less than a maximum value (e.g., indicating various levels of semi-transparency), and the maximum value may indicate an opaque object. In one embodiment, transparent objects may be implemented using a general transparency model in which the foreground and the background alpha and color values are combined using a blending function 130 (also referred to as a compositing operator).

In one embodiment, the GPU 100A may include GPU program code 120 that is executable by the GPU 100A to perform aspects of the techniques discussed herein. Elements of the GPU program code 120 may be provided to the GPU 100A by a host computer system (e.g., the data source 180) and/or native to the GPU 100A. TheGPU program code 120 may comprise a vertex shader and/or a pixel shader. A vertex shader comprises program instructions that are executable by the GPU 100A to determine properties (e.g., position) of a particular vertex. A vertex shader may expect input such as uniform variables (e.g., constant values for each invocation of the vertex shader) and vertex attributes (e.g., per-vertex data). A pixel shader comprises program instructions that are executable by the GPU 100A to determine properties (e.g., color) of a particular pixel. A pixel shader may expect input such as uniform variables (e.g., constant values for each invocation of the pixel shader) and pixel attributes (e.g., per-pixel data). The pixel shader may implement a particular blending function 130 in computing color and/or alpha values of a pixel. In generating the anti-aliased output 195, both the vertex shader and the pixel shader may be executed at various points in the graphics pipeline.

As illustrated in FIG. 1, the GPU memory 110 may comprise various buffers such as a depth buffer (i.e., Z-buffer) 140, a stencil buffer (not shown), and an image buffer 150. Each buffer may comprise a two-dimensional array of pixel data (e.g., color values) and/or pixel metadata (e.g., depth values, stencil values, etc.). The image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 150 may be the same resolution as the target resolution of the data target 190. The image buffer 150 may comprise a screen buffer which is provided directly to the data target 190. In one embodiment, the image buffer 150 and the depth buffer 140 may be the same resolution, and each location (i.e., a pixel) in the image buffer may correspond to a respective location in the depth buffer 140. Each value stored in the depth buffer 140 may indicate a relative depth or distance of the corresponding pixel from a viewpoint.

The GPU 100A may include various built-in functions to assist in the rendering of artwork. In one embodiment, the GPU 100A may include a Z-test (i.e., depth test) function operable to perform comparisons of Z-values (i.e., depth values in the depth buffer 140) and take action accordingly (e.g., keep or discard pixels). In one embodiment, the GPU 100A may include a stencil test function operable to perform comparisons of stencil values (e.g., in the stencil buffer) and take action accordingly (e.g., keep or discard pixels). Functions such as the Z-test and stencil test may be enabled, disabled, and/or otherwise configured through invocation of appropriate functions in the GPU API and/or by operation of the anti-aliasing program code 120.

Figure 2:
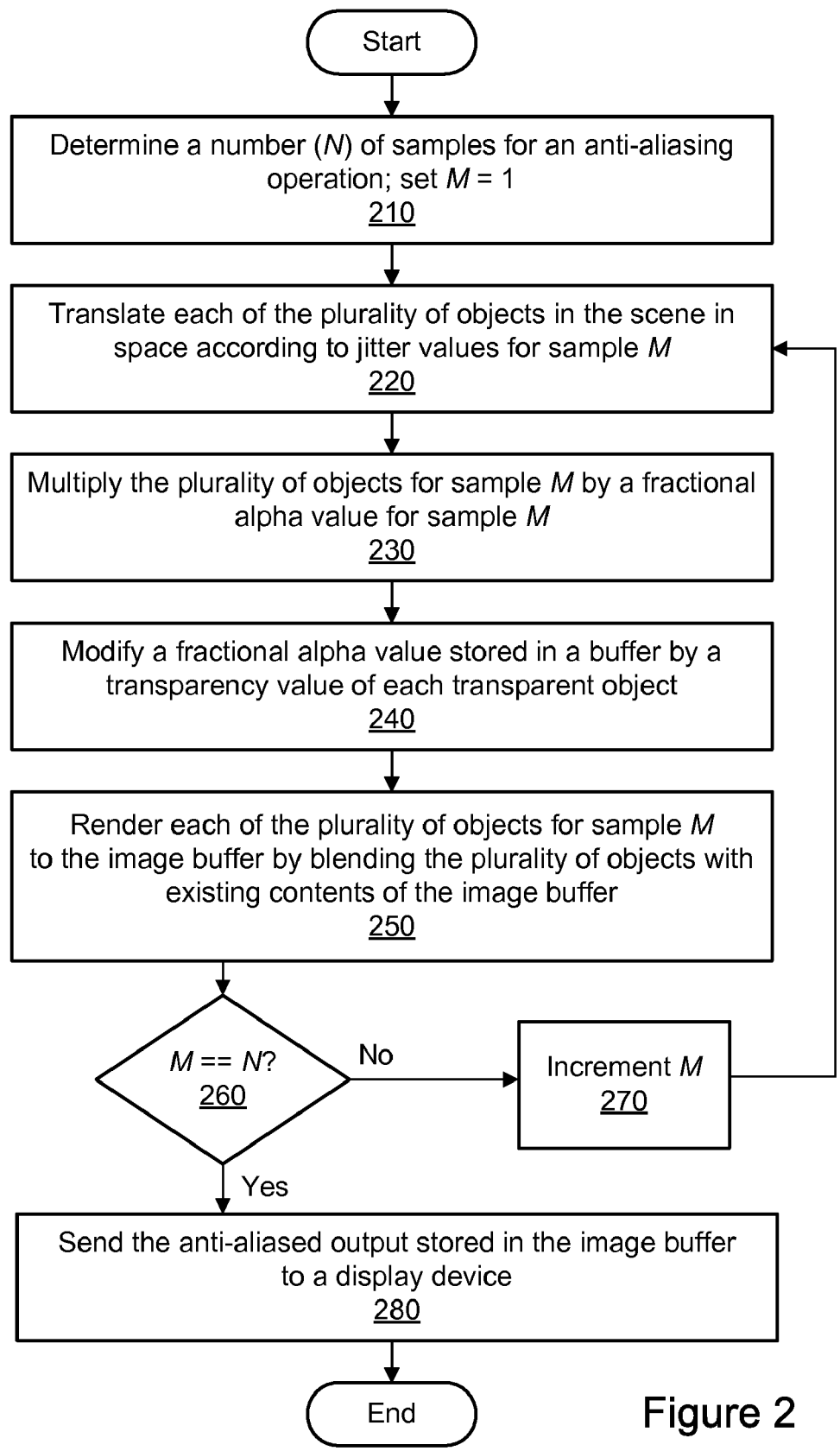
FIG. 2 is a flow diagram illustrating a method for rendering anti-aliased artwork directly to a screen buffer at display resolution according to one embodiment.

FIG. 2 is a flow diagram illustrating a method for rendering anti-aliased artwork directly to a screen buffer at display resolution according to one embodiment. The artwork input may comprise a scene comprising a plurality of objects. In one embodiment, the plurality of objects may comprise one or more opaque objects and one or more transparent objects.

As shown in block 210, a number (N) of samples for an anti-aliasing operation may be determined. In one embodiment, the "smoothness" of the anti-aliased output 195 may be improved with an increase in N (up to a point at which the diminishing marginal returns of an additional sample may yield an imperceptible difference in the quality of the anti-aliased output). In one embodiment, N may be any positive nonzero integer. In contrast to the typical super-sampling and jittering techniques described previously, N may not be a power of 2 or even a multiple of 2. The value N may be a default value, may be specified by a user, may be determined by reading a configuration file or setting, or may otherwise be provided to the anti-aliasing program code 120. The value of N may vary from scene to scene. In one embodiment, for example, a value of N=8 may be suitable for rendering particular scenes in Adobe Flash®.

After a loop counter of M is set to a suitable initial value (i.e., 1), blocks 220 through 250 may then be performed for each of the N samples to implement the anti-aliasing operation. As shown in block 220, each of the plurality of objects in the scene may be translated in space (i.e., "jittered") according to jitter values for the respective sample M. An example of jittering is discussed below with respect to FIGS. 3A and 3B.

Each instance of jittering may translate a scene by a small amount (e.g., in the x and y dimensions), usually less than the size of a pixel. The jitter values may vary for each of the N samples. In one embodiment, the jitter values may be determined using an n-rook sampling algorithm.

As shown in block 230, the plurality of objects for the sample M may be multiplied by a fractional alpha value for the sample M. In one embodiment, the fractional alpha value for each of the plurality of objects may be set to a value inversely proportional to N such as 1/N. In one embodiment, the sum of the fractional alpha values for each of the samples is approximately equal to 1.

In one embodiment, the fractional alpha value may vary for each of the samples. In one embodiment, the samples are processed in an order, and the fractional alpha value for each respective sample (after the first sample) is less than the fractional alpha value for a prior sample. For example, the fractional alpha value for the first sample may be ½, the fractional alpha value for the second sample may be ⅓, the fractional alpha value for the third sample may be ¼, and so on. In this manner, a loss of precision in the anti-aliased output 195 due to the multiplication by the fractional alpha values may be reduced. Therefore, as shown in block 240, the fractional alpha value stored in the buffer may be modified by the transparency value of each transparent object. For example, the fractional alpha value may be reduced in value each time a transparent object is rendered.

As shown in block 250, each of the plurality of objects for the sample M may be rendered to an image buffer. In one embodiment, the same buffer (e.g., image buffer 150) may be used for each of the N samples. The buffer may comprise a screen buffer having the same resolution as the target display device. The plurality of objects may be added to the buffer by blending the plurality of objects for the sample M with existing contents of the buffer (i.e., the contributions of previous samples). Further details of the operations shown in blocks 230 through 250 are discussed below with respect to FIG. 5.

As shown in block 260, it may be determined whether all the samples have been generated (e.g., whether M is equal to N). If not, then M may be incremented as shown in block 270, and additional samples may be generated. If so, then the anti-aliasing operation ends, and the anti-aliased output stored in the image buffer (i.e., accumulated for all N samples) may be sent directly to a display device as shown in block 280.

Figure 3A:
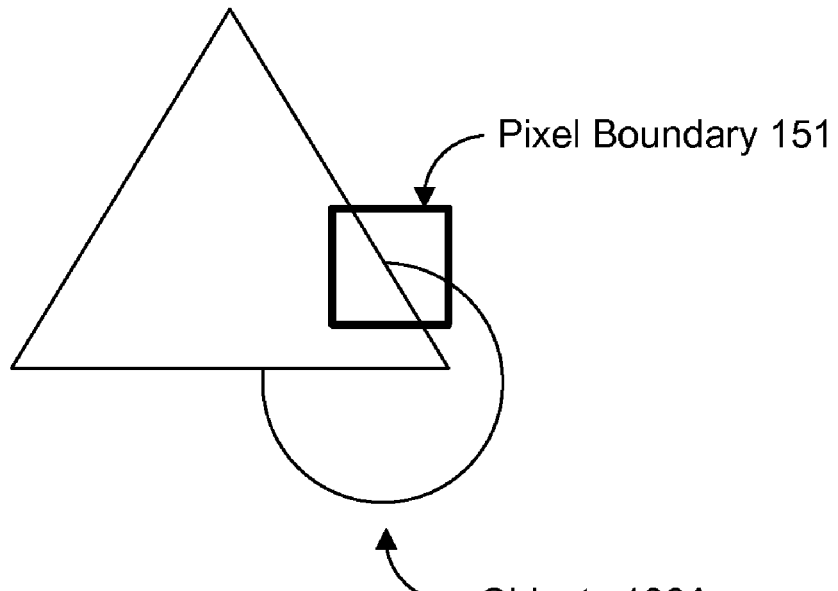
FIG. 3A is a block diagram illustrating an initial state of a scene prior to jittering according to one embodiment.
Figure 3B:
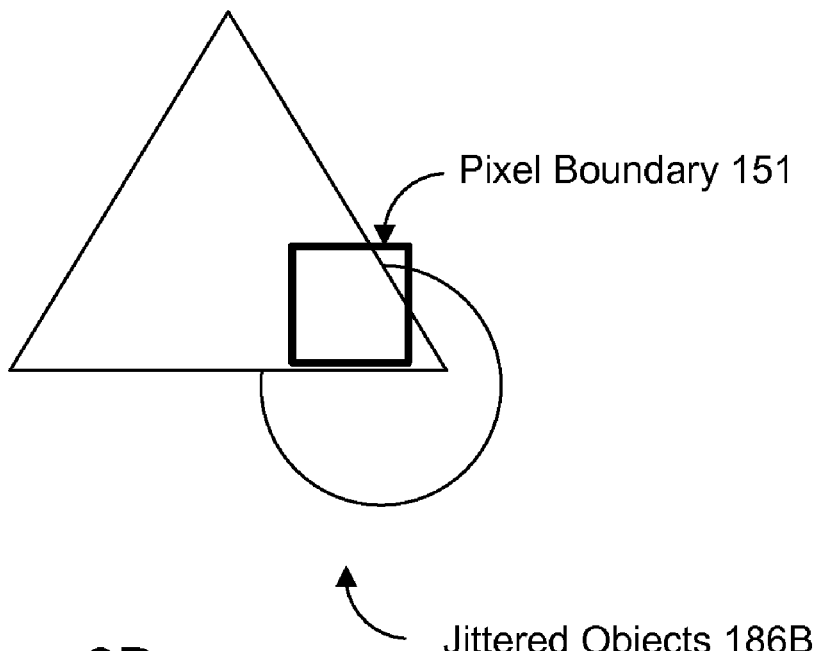
FIG. 3B is a block diagram illustrating a jittered state of a scene according to one embodiment.

FIG. 3A is a block diagram illustrating an initial state of a scene prior to jittering according to one embodiment. FIG. 3B is a block diagram illustrating a jittered state of the same scene according to one embodiment. The objects 186A and 186B shown in FIGS. 3A and 3B are presented for purposed of illustration and example and are not intended to be limiting. For clarity of illustration, the position of the objects 186A and 186B is shown, but not the color and transparency values. As shown in FIG. 3A, a portion of the example objects 186A is within a boundary 151, wherein the boundary 151 has approximately the same dimensions as a destination pixel in the image buffer 150. As shown in FIG. 3B, the portion of the jittered objects 186B within the pixel boundary 151 has changed slightly after the objects have been translated by small jitter values (e.g., values less than a pixel's dimensions) in the x and y dimensions. For any given sample M, all of the objects in the scene may be translated by the same vector.

Figure 4:
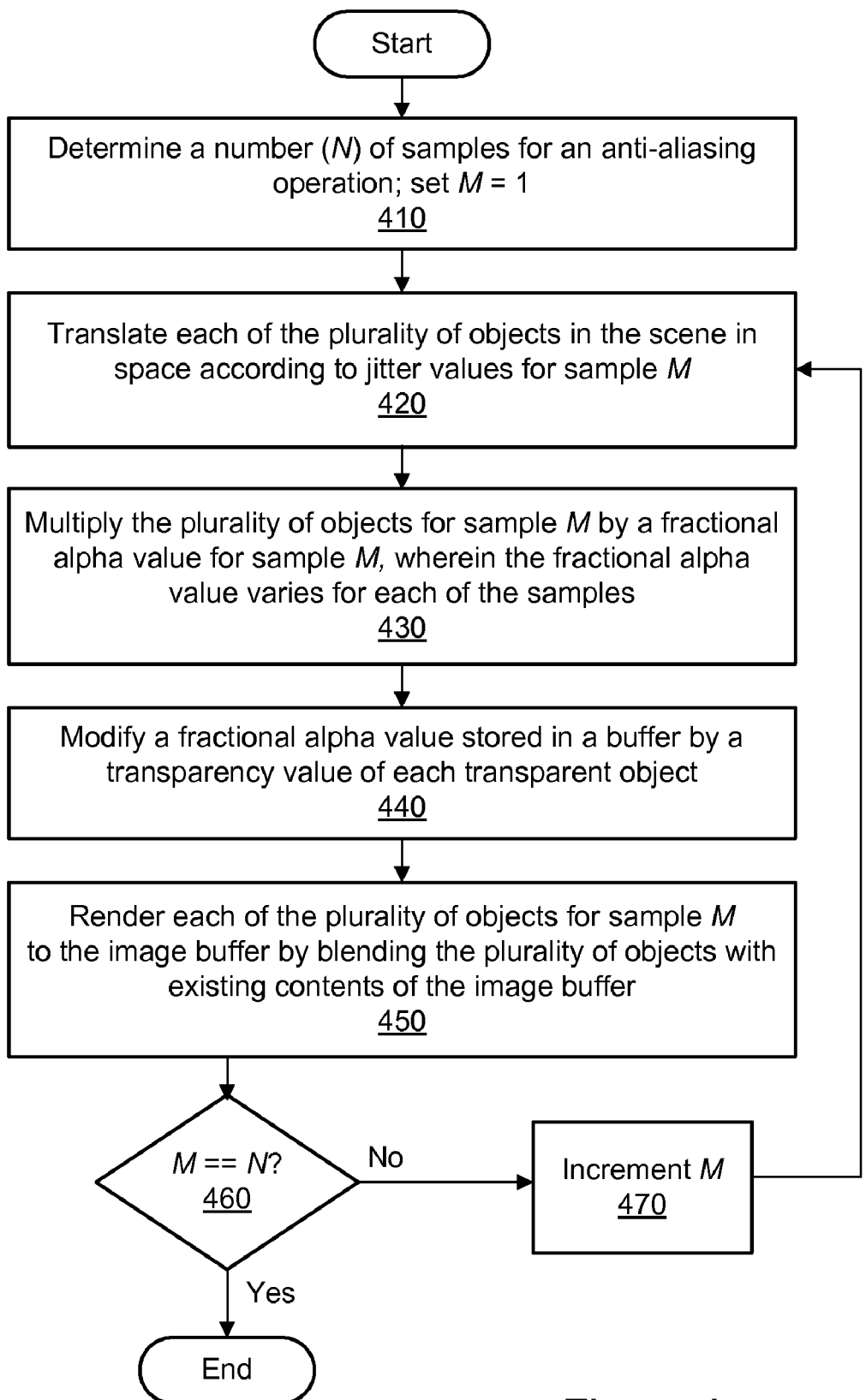
FIG. 4 is a flow diagram illustrating a method for rendering anti-aliased artwork using variable alpha values according to one embodiment.

FIG. 4 is a flow diagram illustrating a method for rendering anti-aliased artwork using variable alpha values according to one embodiment. The artwork input may comprise a scene comprising a plurality of objects. In one embodiment, the plurality of objects may comprise one or more opaque objects and one or more transparent objects.

As shown in block 410, a number (N) of samples for an anti-aliasing operation may be determined. As discussed above, the "smoothness" of the anti-aliased output 195 may be improved with an increase in N (up to a point at which the diminishing marginal returns of an additional sample may yield an imperceptible difference in the quality of the anti-aliased output). In one embodiment, N may be any positive nonzero integer. In contrast to the typical super-sampling and jittering techniques described previously, N may not be a power of 2 or even a multiple of 2. The value N may be a default value, may be specified by a user, may be determined by reading a configuration file or setting, or may otherwise be provided to the anti-aliasing program code 120. The value of N may vary from scene to scene.

After a loop counter of M is set to a suitable initial value (i.e., 1), blocks 420 through 450 may then be performed for each of the N samples to implement the anti-aliasing operation. As shown in block 420, each of the plurality of objects in the scene may be translated in space (i.e., "jittered") according to jitter values for the respective sample M. As discussed above, the jitter values may vary for each of the N samples. In one embodiment, the jitter values may be determined using an n-rook sampling algorithm.

As shown in block 430, the plurality of objects for the sample M may be multiplied by a fractional alpha value for the sample M, where the fractional alpha value may vary for each of the samples. In one embodiment, the samples are processed in an order, and the fractional alpha value for each respective sample (after the first sample) is less than the fractional alpha value for a prior sample. For example, the fractional alpha value for the first sample may be ½, the fractional alpha value for the second sample may be ⅓, the fractional alpha value for the third sample may be ¼, and so on. In this manner, a loss of precision in the anti-aliased output 195 due to the multiplication by the fractional alpha values may be reduced. Therefore, as shown in block 440, the fractional alpha value stored in the buffer may be modified by the transparency value of each transparent object. For example, the fractional alpha value may be reduced in value each time a transparent object is rendered.

As shown in block 450, each of the plurality of objects for the sample M may be rendered to an image buffer. In one embodiment, the same buffer (e.g., image buffer 150) may be used for each of the N samples. The buffer may comprise a screen buffer having the same resolution as the target display device. The plurality of objects may be added to the buffer by blending the plurality of objects for the sample M with existing contents of the buffer (i.e., the contributions of previous samples). Further details of the operations shown in blocks 430 through 450 are discussed below with respect to FIG. 5.

As shown in block 460, it may be determined whether all the samples have been generated (e.g., whether M is equal to N). If not, then M may be incremented as shown in block 470, and additional samples may be generated. If so, then the anti-aliasing operation ends, and the anti-aliased result may be displayed.

Figure 5:
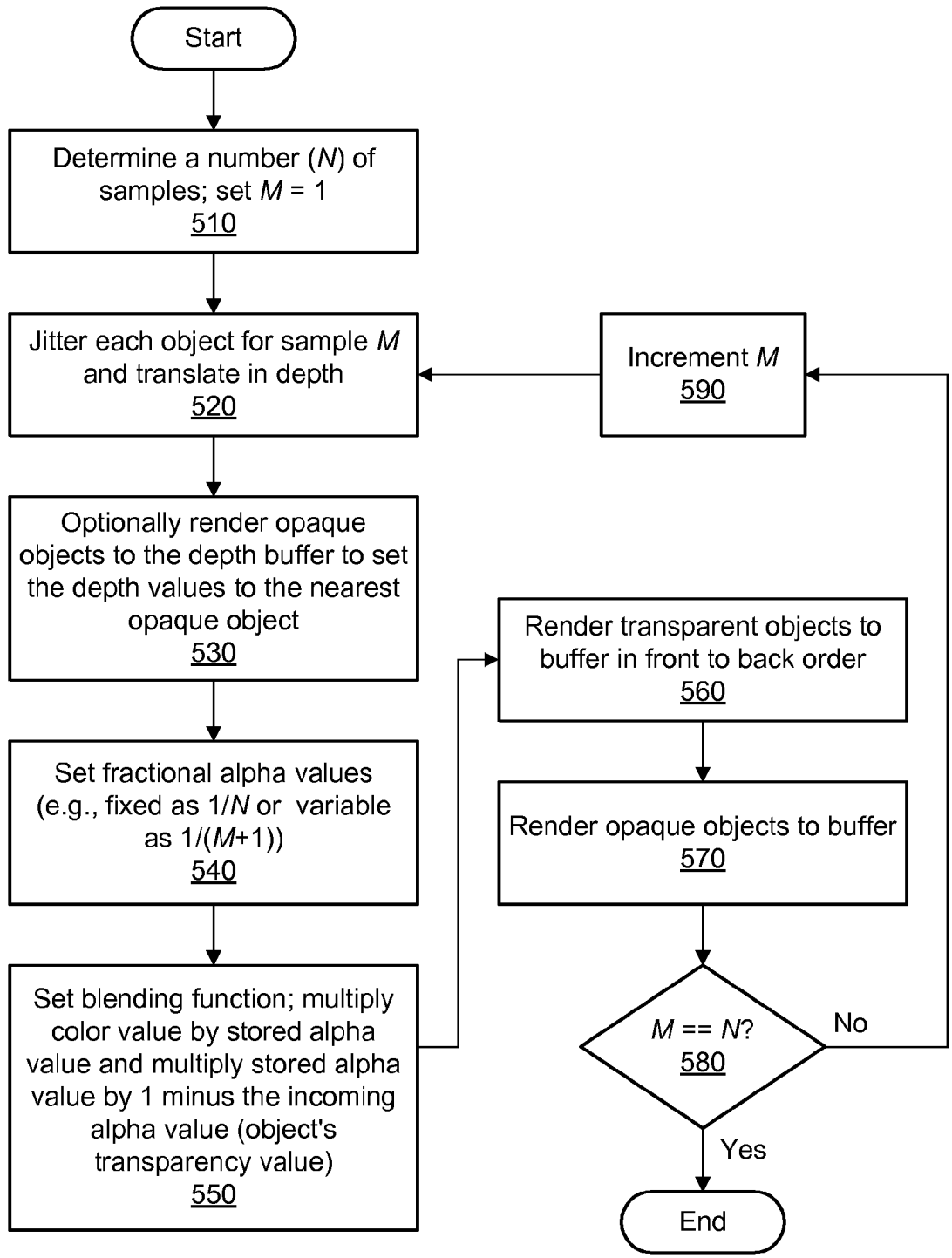
FIG. 5 is a flow diagram illustrating further aspects of a method for rendering anti-aliased artwork according to one embodiment.

FIG. 5 is a flow diagram illustrating further aspects of a method for rendering anti-aliased artwork according to one embodiment. As shown in block 510 and as discussed above, a number (N) of samples for an anti-aliasing operation may be determined. After a loop counter of M is set to a suitable initial value (i.e., 1), blocks 520 through 570 may then be performed for each of the N samples to implement the anti-aliasing operation. As shown in block 520 and as discussed above, each of the plurality of objects in the scene may be translated in space (i.e., "jittered") according to jitter values for the respective sample M.

In one embodiment, the depth buffer may be cleared prior to rendering each sample. However, the need to clear the depth buffer may be avoided in one embodiment by translating each sample M in depth so that each iteration is rendered closer in depth than the prior sample (i.e., M−1). If the scene has a depth D, for example, then each sample may be translated in depth by D relative to the previous sample, as long as the total range of the depth buffer 140 is sufficient to express N * D. The translation in depth (i.e., in the z dimension) may be performed in addition to the relatively small jittering translations (e.g., in the x and y dimensions).

As shown in block 530, the depth buffer 140 may be set to the distance of the nearest opaque object by rendering the opaque objects in the scene to the depth buffer 140. In one embodiment, the operation shown in block 530 may be performed only if the objects in the scene have not previously been sorted from front to back. In one embodiment, the depth values may be set by rendering thick boundaries (e.g., silhouettes) of the objects. The thickness of the boundaries may be such that the boundaries covers all pixels that are touched by a jittered sample (e.g., equal to the length of a pixel diagonal).

As shown in block 540, the alpha value in the buffer 150 for each of the objects may be set to the fractional alpha value. In one embodiment, a fixed value may be used such that the fractional alpha value for each object is 1/N. In one embodiment, a variable alpha value such as 1/(M+1) may be used for each respective sample (e.g., ½, ⅓, ¼, etc., in successive iterations of the loop).

As shown in block 550, the blending function 130 may be set so that the incoming color for each pixel in the buffer 150 is multiplied by the fixed or variable fractional alpha value stored for that pixel in the buffer 150 and then added to the existing color for that pixel in the buffer 150. In one embodiment, the blending function 130 may be set through a call to a suitable API (e.g., OpenGL) implemented by the GPU 100A. Additionally, the alpha values for pixels in the buffer 150 may be multiplied by the object's transparency value. The object's transparency value may be equal to 1 minus the object's fractional alpha value. For example, the transparency value of an opaque object is 0 (i.e., 1 minus the object's alpha value of 1), and a mostly transparent object may have a transparency value of 0.9 (i.e., 1 minus the object's alpha value of 0.1).

As shown in block 560, the transparent objects in the scene may be rendered to the buffer 150 in front to back order. The transparent objects may be rendered using the blending function 130. The colors of transparent objects may be pre-multiplied by the object's alpha value (i.e., 1 minus the transparency value). For example, if an object color is {1, 1, 1} and the transparency value is 0.25 (i.e., more opaque than it is transparent), then the object color should be stored as {0.75, 0.75, 0.75}.

As shown in block 570, the opaque objects in the scene may be rendered to the buffer 150. In one embodiment, the opaque objects may be rendered using the same blending function 130 but with the original colors (i.e., not multiplied by 1 minus the transparency value).

If a variable alpha value is used, then a polygon may then be rendered that covers all the objects, and the buffer 150 may also be multiplied by 1−(1/M+1). As shown in block 580, it may be determined whether all the samples have been generated (e.g., whether M is equal to N). If not, then M may be incremented as shown in block 590, and additional samples may be generated. If so, then the anti-aliasing operation ends, and the anti-aliased result may be displayed.

Figure 6:
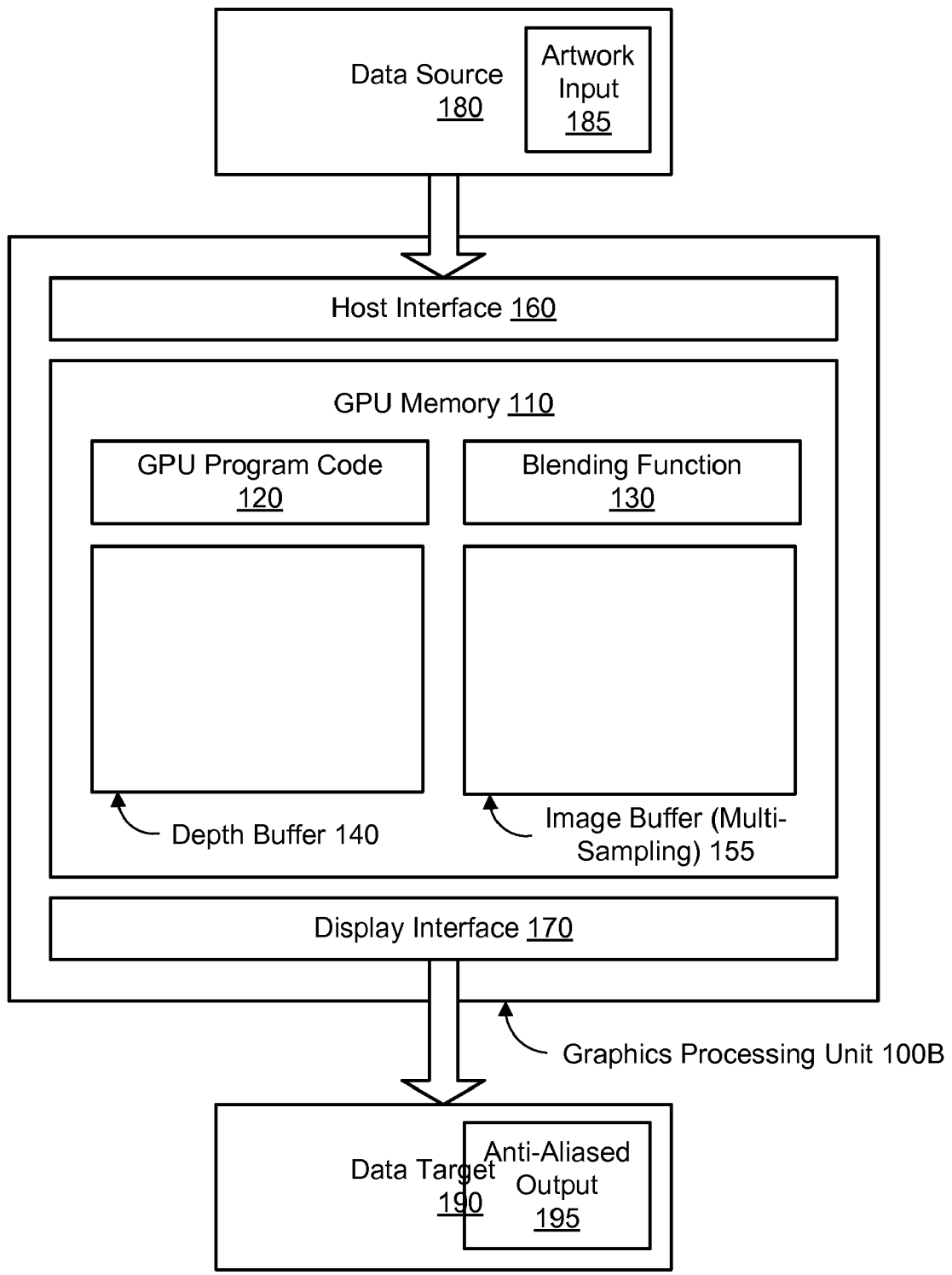
FIG. 6 is a block diagram illustrating one embodiment of a GPU configured for rendering anti-aliased artwork using a multi-sampling buffer according to one embodiment.

FIG. 6 is a block diagram illustrating one embodiment of a GPU configured for rendering anti-aliased artwork using a multi-sampling buffer according to one embodiment. In one embodiment, each jittered set of objects in each iteration of the loop may be rendered to a multi-sampling image buffer 155 rather than the single-sampling image buffer 150 shown in FIG. 1. The multi-sampling image buffer 155 may comprise a plurality of samples (e.g., typically a power of two), each with its own color and alpha values, for each pixel in a target image. When an object is rendered to the multi-sampling image buffer 155, multiple sets of color and alpha values may be created for each target pixel. Each set of samples in the multi-sampling image buffer 155 corresponding to a target pixel may be averaged or otherwise filtered to produce anti-aliased output. Aspects of the anti-aliasing techniques discussed with reference to FIGS. 1 through 6 may be used in combination with the multi-sampling image buffer 155. In this manner, the number of iterations of the jittering loop may be reduced.

FIG. 7 is a block diagram illustrating constituent elements of a computer system 900 that is configured to implement embodiments of the system and method for rendering anti-aliased artwork. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU 100 (e.g., GPU 100A or GPU 100B). Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 7, as illustrated by the ellipsis shown.

In various embodiments, the elements shown in FIGS. 2, 4, and 5 may be performed in a different order than the illustrated order. In FIGS. 2, 4, and 5, any of the operations described in the elements may be performed programmatically (i.e., by a computer according to a computer program). In FIGS. 2, 4, and 5, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method for generating anti-aliased output based on a scene comprising a plurality of objects, the method comprising:
   determining a number (N) of samples for an anti-aliasing operation; and
   for each of the samples:
      translating each of the plurality of objects in space according to jitter values for the respective sample, wherein the jitter values for the respective sample are used for translating each of the plurality of objects in the scene;
      multiplying the plurality of objects for the respective sample by a fractional alpha value for the respective sample, wherein the fractional alpha value varies for each of the samples, and wherein the plurality of objects comprises one or more opaque objects and one or more transparent objects;
      modifying a fractional alpha value stored in a buffer by a transparency value of each transparent object; and
      rendering the plurality of objects for the respective sample to the buffer by blending the plurality of objects for the respective sample with existing contents of the buffer;
   wherein each of the plurality of objects in the scene are rendered to the buffer for each respective sample before each of the plurality of objects in the scene are rendered to the buffer for the next respective sample.

2. The method as recited in claim 1, wherein the samples are ordered, and wherein each respective sample after the first sample is rendered closer in depth than a prior sample.

3. The method as recited in claim 1, wherein the samples are ordered, and wherein the fractional alpha value for each respective sample after the first sample is less than the fractional alpha value for a prior sample.

4. The method as recited in claim 1, wherein the buffer comprises a multi-sampling buffer.

5. The method as recited in claim 1, wherein N is not a multiple of 2.

6. A computer-implemented method for generating anti-aliased output based on a scene comprising a plurality of objects, the method comprising:
determining a number (N) of samples for an anti-aliasing operation; and
for each of the samples:
translating each of the plurality of objects in space according to jitter values for the respective sample, wherein the jitter values for the respective sample are used for translating each of the plurality of objects in the scene;
multiplying the plurality of objects for the respective sample by a fractional alpha value for the respective sample;
modifying a fractional alpha value stored in a buffer by a transparency value of each transparent object; and
rendering the plurality of objects for the respective sample to the buffer by blending the plurality of objects for the respective sample with existing contents of the buffer;
wherein each of the plurality of objects in the scene are rendered to the buffer for each respective sample before each of the plurality of objects in the scene are rendered to the buffer for the next respective sample; and
sending anti-aliased output stored in the buffer to a display device.

7. The method as recited in claim 6, wherein the samples are ordered, and wherein each respective sample after the first sample is rendered closer in depth than a prior sample.

8. The method as recited in claim 6, wherein the samples are ordered, and wherein the fractional alpha value for each respective sample after the first sample is less than the fractional alpha value for a prior sample.

9. The method as recited in claim 6, wherein the fractional alpha value varies for each of the samples.

10. The method as recited in claim 6, wherein the fractional alpha value for each of the samples is 1/N.

11. The method as recited in claim 6, wherein the buffer comprises a single-sample buffer having a same resolution as the display device.

12. The method as recited in claim 6, wherein the plurality of objects comprises one or more opaque objects and one or more transparent objects.

13. The method as recited in claim 6, wherein N is not a multiple of 2.

14. A non-transitory, computer-readable storage medium, comprising program instructions for generating anti-aliased output based on a scene comprising a plurality of objects, wherein the program instructions are computer-executable to implement:
determining a number (N) of samples for an anti-aliasing operation; and
for each of the samples:
translating each of the plurality of objects in space according to jitter values for the respective sample, wherein the jitter values for the respective sample are used for translating each of the plurality of objects in the scene;
multiplying the plurality of objects for the respective sample by a fractional alpha value for the respective sample, wherein the fractional alpha value varies for each of the samples, and wherein the plurality of objects comprises one or more opaque objects and one or more transparent objects;
modifying a fractional alpha value stored in a buffer by a transparency value of each transparent object; and
rendering the plurality of objects for the respective sample to the buffer by blending the plurality of objects for the respective sample with existing contents of the buffer;
wherein each of the plurality of objects in the scene are rendered to the buffer for each respective sample before each of the plurality of objects in the scene are rendered to the buffer for the next respective sample.

15. The non-transitory, computer-readable storage medium as recited in claim 14, wherein the samples are ordered, and wherein each respective sample after the first sample is rendered closer in depth than a prior sample.

16. The non-transitory, computer-readable storage medium as recited in claim 14, wherein the samples are ordered, and wherein the fractional alpha value for each respective sample after the first sample is less than the fractional alpha value for a prior sample.

17. The non-transitory, computer-readable storage medium as recited in claim 14, wherein the buffer comprises a multi-sampling buffer.

18. The non-transitory, computer-readable storage medium as recited in claim 14, wherein N is not a multiple of 2.

19. A non-transitory, computer-readable storage medium, comprising program instructions for generating anti-aliased output based on a scene comprising a plurality of objects, wherein the program instructions are computer-executable to implement:
determining a number (N) of samples for an anti-aliasing operation; and
for each of the samples:
translating each of the plurality of objects in space according to jitter values for the respective sample, wherein the jitter values for the respective sample are used for translating each of the plurality of objects in the scene;
multiplying the plurality of objects for the respective sample by a fractional alpha value for the respective sample;
modifying a fractional alpha value stored in a buffer by a transparency value of each transparent object; and
rendering the plurality of objects for the respective sample to the buffer by blending the plurality of objects for the respective sample with existing contents of the buffer;
wherein each of the plurality of objects in the scene are rendered to the buffer for each respective sample before each of the plurality of objects in the scene are rendered to the buffer for the next respective sample; and
sending anti-aliased output stored in the buffer to a display device.

20. The non-transitory, computer-readable storage medium as recited in claim 19, wherein the samples are ordered, and wherein each respective sample after the first sample is rendered closer in depth than a prior sample.

21. The non-transitory, computer-readable storage medium as recited in claim 19, wherein the samples are ordered, and wherein the fractional alpha value for each respective sample after the first sample is less than the fractional alpha value for a prior sample.

22. The non-transitory, computer-readable storage medium as recited in claim 19, wherein the fractional alpha value varies for each of the samples.

23. The non-transitory, computer-readable storage medium as recited in claim 19, wherein the fractional alpha value for each of the samples is 1/N.

24. The non-transitory, computer-readable storage medium as recited in claim 19, wherein the buffer comprises a single-sample buffer having a same resolution as the display device.

25. The non-transitory, computer-readable storage medium as recited in claim 19, wherein the plurality of objects comprises one or more opaque objects and one or more transparent objects.

26. The non-transitory, computer-readable storage medium as recited in claim 19, wherein N is not a multiple of 2.

27. A system, comprising:
a at least one processor; and
a memory coupled to the at least one processor, wherein the memory comprises an image buffer, wherein the memory is configured to store a scene comprising a plurality of objects, and wherein the memory is configured to store program instructions executable by the at least one processor to:
determine a number (N) of samples for an anti-aliasing operation; and
for each of the samples:
translate each of the plurality of objects in space according to jitter values for the respective sample, wherein the jitter values for the respective sample are used for translating each of the plurality of objects in the scene;
multiply the plurality of objects for the respective sample by a fractional alpha value for the respective sample, wherein the fractional alpha value varies for each of the samples, and wherein the plurality of objects comprises one or more opaque objects and one or more transparent objects;
modify a fractional alpha value stored in a buffer by a transparency value of each transparent object; and
render the plurality of objects for the respective sample to the buffer by blending the plurality of objects for the respective sample with existing contents of the buffer;
wherein each of the plurality of objects in the scene are rendered to the buffer for each respective sample before each of the plurality of objects in the scene are rendered to the buffer for the next respective sample.

28. The system as recited in claim 27, wherein the samples are ordered, and wherein each respective sample after the first sample is rendered closer in depth than a prior sample.

29. The system as recited in claim 27, wherein the samples are ordered, and wherein the fractional alpha value for each respective sample after the first sample is less than the fractional alpha value for a prior sample.

30. The system as recited in claim 27, wherein the buffer comprises a multi-sampling buffer.

31. The system as recited in claim 27, wherein N is not a multiple of 2.

32. A system, comprising:
at least one processor;
a display device coupled to the at least one processor; and
a memory coupled to the at least one processor, wherein the memory comprises an image buffer, wherein the memory is configured to store a scene comprising a plurality of objects, and wherein the memory is configured to store program instructions executable by the at least one processor to:
determine a number (N) of samples for an anti-aliasing operation; and
for each of the samples:
translate each of the plurality of objects in space according to jitter values for the respective sample, wherein the jitter values for the respective sample are used for translating each of the plurality of objects in the scene;
multiply the plurality of objects for the respective sample by a fractional alpha value for the respective sample;
modify a fractional alpha value stored in a buffer by a transparency value of each transparent object; and
render the plurality of objects for the respective sample to the buffer by blending the plurality of objects for the respective sample with existing contents of the buffer;
wherein each of the plurality of objects in the scene are rendered to the buffer for each respective sample before each of the plurality of objects in the scene are rendered to the buffer for the next respective sample; and
send contents of the buffer to the display device.

33. The system as recited in claim 32, wherein the samples are ordered, and wherein each respective sample after the first sample is rendered closer in depth than a prior sample.

34. The system as recited in claim 32, wherein the samples are ordered, and wherein the fractional alpha value for each respective sample after the first sample is less than the fractional alpha value for a prior sample.

35. The system as recited in claim 32, wherein the fractional alpha value varies for each of the samples.

36. The system as recited in claim 32, wherein the fractional alpha value for each of the samples is 1/N.

37. The system as recited in claim 32, wherein the buffer comprises a single-sample buffer having a same resolution as the display device.

38. The system as recited in claim 32, wherein the plurality of objects comprises one or more opaque objects and one or more transparent objects.

39. The system as recited in claim 32, wherein N is not a multiple of 2.

* * * * *